Patented June 25, 1929.

1,718,286

UNITED STATES PATENT OFFICE.

JESSE A. GUYER, OF LA SALLE, AND MAURICE C. TAYLOR, OF NIAGARA FALLS, NEW YORK, ASSIGNORS TO THE MATHIESON ALKALI WORKS, INC., OF NEW YORK, N. Y., A CORPORATION OF VIRGINIA.

MANUFACTURE OF CALCIUM HYPOCHLORITE.

No Drawing.   Application filed August 4, 1926.   Serial No. 127,171.

This invention relates to improvements in the production of calcium hypochlorite. Calcium hypochlorite, that is $Ca(OCl)_2$, in pure form is relatively stable, but calcium chloride if present in substantial amount makes it relatively unstable. This is apparently due to the hygroscopic properties of calcium chloride. This invention provides an improved method of making calcium hypochlorite products of high purity, particularly with reference to contamination with calcium chloride, and which has several further important advantages.

According to the present invention, a solution of caustic soda is first chlorinated with the resulting production of a solution containing sodium hypochlorite and sodium chloride and this solution is then treated with calcium chloride to produce calcium hypochlorite with the accompanying formation of additional quantities of sodium chloride. The chlorination of the caustic soda solution is advantageously carried out so that a part of the sodium chloride formed is precipitated and can be separated at the end of the chlorination and before the treatment with calcium chloride is effected. The calcium hypochlorite solution resulting after treatment with calcium chloride may be evaporated to dryness to produce a calcium hypochlorite product. If the amount of calcium chloride added is not more than sufficient to react with the sodium hypochlorite and sodium hydroxide present, the resulting product will be substantially free from calcium chloride although it will contain substantial amounts of sodium chloride. Sodium chloride, however, does not decrease the stability of calcium hypochlorite. Or, by the addition of water just sufficient to dissolve the sodium chloride which would otherwise precipitate, the process may be carried out to produce a slurry containing in the solid phase only calcium hypochlorite which may then be separated in any suitable manner, for example by filtration.

One way of carrying out the invention will be illustrated by the following example: 55 pounds of caustic soda are dissolved in 65.3 pounds of water and the solution is chlorinated only until about 6% of the caustic soda used remains unchlorinated. Precipitated sodium chloride is allowed to settle and the clear liquor decanted. Any sodium hypochlorite remaining in the salt may be recovered by washing with water and using the wash water in making up a solution of caustic soda for a subsequent chlorination. After separation of precipitated sodium chloride, the solution may, for example, comprise about 29% of sodium hypochlorite, 7.5% of sodium chloride, 1.5% of sodium hydroxide and 62% of water. To 100 pounds of this sodium hypochlorite solution, 46.8 pounds of solid calcium chloride ($CaCl_2.6H_2O$) are added slowly while maintaining the temperature below about 25° C. The slurry is agitated for a short period after the addition of calcium chloride is completed to obtain a uniform mixture. This slurry is evaporated to dryness to obtain a calcium hypochlorite product which may contain about 40% calcium hypochlorite, the balance being principally sodium chloride.

Instead of recovering the hypochlorite product by evaporating the mixture resulting after the addition of calcium chloride to dryness the calcium hypochlorite product may be filtered from the slurry, or otherwise separated, and the product so obtained dried either with or without pressing. Likewise, the sodium hypochlorite solution may be diluted with water sufficiently to prevent the precipitation of sodium chloride during the addition of calcium chloride so that the solid phase, when the addition of calcium chloride is completed, will consist only of calcium hypochlorite. Calcium hypochlorite so precipitated may then be separated from the solution, for example by filtration, and dried either with or without pressing.

For example: 100 pounds of sodium hypochlorite solution described in the foregoing example, after separation of precipitated sodium chloride, are diluted with 50.7 pounds of water, and this solution is then treated with 31.4 pounds of solid calcium chloride ($CaCl_2.2H_2O$). The precipitated calcium hypochlorite is separated from the solution, for example by filtration, and may be dried either with or without pressing. The solution remaining after separation of the precipitated calcium hypochlorite may be handled in a number of ways. For example, it may be used for bleaching purposes, or it may be treated with lime to recover available chlorine in the form of a precipitated basic calcium hypochlorite, or it may be treated with sodium hydroxide or sodium carbonate to precipitate calcium present as either the hydroxide or the carbonate, the precipitated calcium compound separated from the solution, and the resulting solution containing sodium hypochlorite re-used in a subsequent operation for the production of a sodium hypochlorite solution, to be treated with calcium chloride.

The foregoing description has related particularly to the treatment of solutions prepared by the chlorination of caustic soda with calcium chloride. By modifying the process in several respects, it is possible to eliminate filtration or evaporation operations. For example, a solution containing sodium hypochlorite may be prepared by chlorination of a solution of caustic soda, the sodium hypochlorite separated from the solution by freezing, and the sodium hypochlorite so separated treated with calcium chloride to produce a mixture of calcium hypochlorite and sodium chloride.

To illustrate: A solution of sodium hypochlorite prepared by chlorination of caustic soda, such for example as that which has been described containing about 29% of sodium hypochlorite, 7.5% of sodium chloride, 1.5% of sodium hydroxide and 62% of water, is cooled to a temperature of about 0° C. or a somewhat lower temperature and the precipitated sodium hypochlorite penta hydrate separated. The separated sodium hypochlorite is then mixed with a chemically equivalent amount of calcium chloride, sufficient water is added to produce a thick paste, and this paste is dried directly without requiring any evaporation or filtration operation. During mixture of the sodium hypochlorite and calcium chloride it is advantageous to maintain the temperature below about 25° C. It will be appreciated that the mixture of sodium hypochlorite and calcium chloride may be carried out with the addition of sufficient water to maintain more or less of the sodium chloride formed in solution, and that the calcium hypochlorite product may be separated from such a solution in any suitable manner, for example by filtration or decantation.

While the foregoing description refers particularly to sodium hydroxide, sodium hypochlorite, sodium chloride and sodium carbonate, corresponding compounds of other alkali metals are also useful in carrying out the invention.

We claim:

1. A process for making calcium hypochlorite which comprises chlorinating a solution of caustic alkali and reacting upon the alkali hypochlorite so produced with calcium chloride.

2. A process for making calcium hypochlorite which comprises chlorinating a solution of caustic alkali, reacting upon the alkali hypochlorite so produced with calcium chloride in the presence of sufficient water to dissolve the alkali chloride formed and separating precipitated calcium hypochlorite from the solution.

3. A process for making calcium hypochlorite which comprises chlorinating a solution of caustic alkali and treating the chlorinated solution with calcium chloride.

4. A process for making calcium hypochlorite which comprises chlorinating a solution of caustic soda and treating the chlorinated solution with calcium chloride.

5. A process for making calcium hypochlorite which comprises chlorinating a solution of caustic soda, separating sodium chloride from the chlorinated solution and treating the solution after separation of sodium chloride with calcium chloride.

6. A process for making calcium hypochlorite which comprises treating an alkali metal hypochlorite with calcium chloride in the presence of water.

In testimony whereof we affix our signatures.

JESSE A. GUYER.
MAURICE C. TAYLOR.